Nov. 7, 1944.  P. MORREALE  2,362,215
FEEDING DEVICE
Filed April 14, 1943
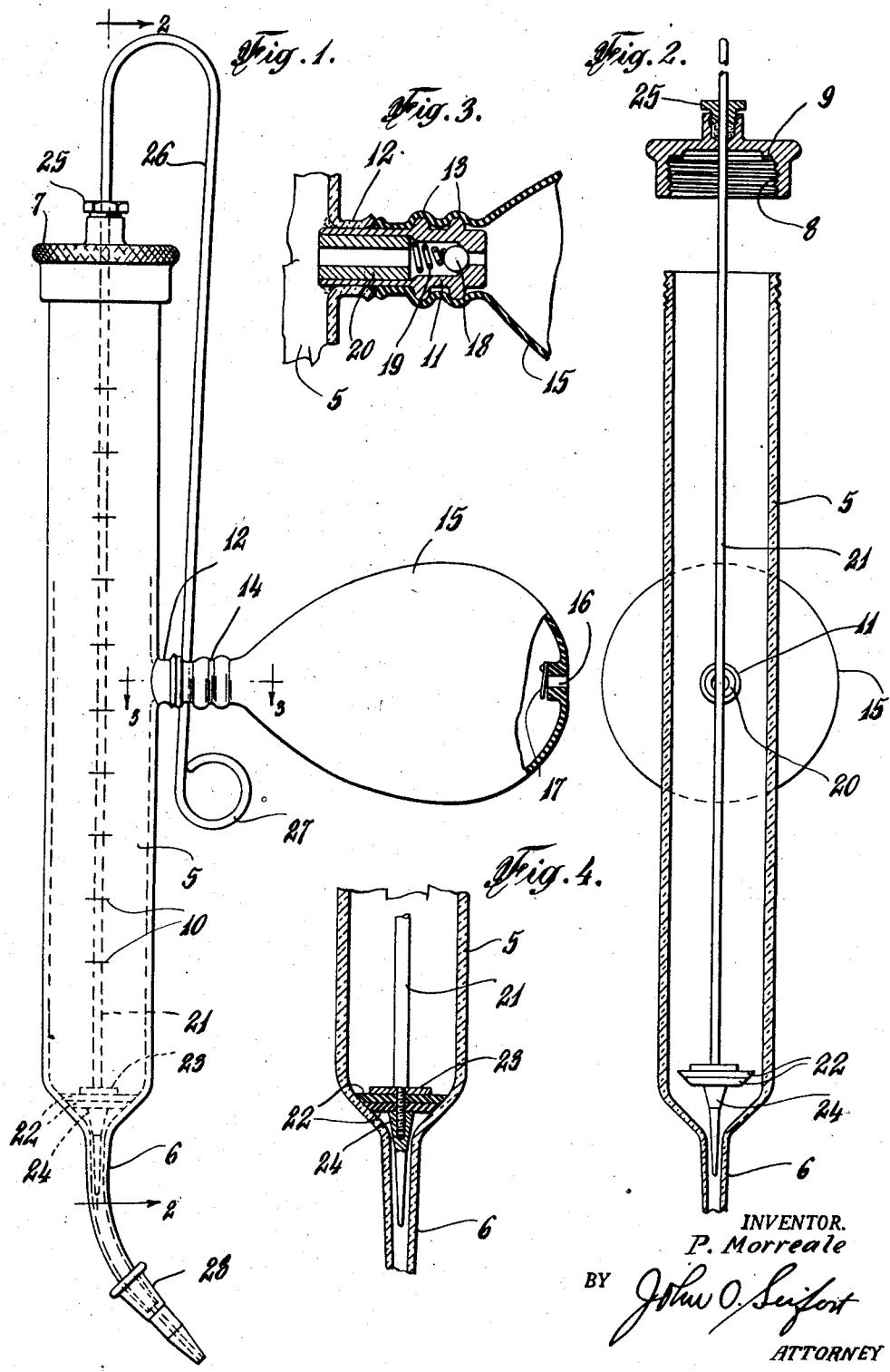
INVENTOR.
P. Morreale
BY John O. Seifert
ATTORNEY Patented Nov. 7, 1944

2,362,215

UNITED STATES PATENT OFFICE 2,362,215

FEEDING DEVICE

Philip Morreale, Brooklyn, N. Y.

Application April 14, 1943, Serial No. 483,025

4 Claims. (Cl. 119—51)

This invention relates to devices for feeding birds and while it is particularly adapted for feeding squabs, it is also adapted for feeding other birds, such as chickens, ducks and geese.

In feeding devices of this character at present there is provided a cylindrical or tubular food containing body having a spout at one end adapted to be engaged in the beak of the bird in feeding the same and the opposite end closed by a removable closure, the food being ejected from the body through the spout by a piston in the body carried at one end of a rod extended through an opening in the closure to actuate the piston from the exterior of the body. In feeding it is necessary to engage the spout of the body into the beak of the bird and then while holding the bird and the feeding device with the spout engaged in the beak of the bird, actuating the piston by the rod in a direction toward the beak of the bird to eject the food into the bird. Should the food choke the spout an extra force is required to actuate the piston with the possibility that the spout will be engaged too far into and injure the bird.

It is an object of the invention to provide an improved feeding device of this character wherein the body of the device is arranged for the connection of means to enter and build up a fluid or air pressure in the body to constitute the medium for ejecting the food from the body.

It is a further object of the invention to provide an improved device of this character wherein the body of the device is arranged for connection of means to enter and build up a fluid or air pressure in the body for ejecting the food from the body, and the provision of valve means for shutting off and controlling the connection of the spout with the body and ejection of the food, and the body may be of transparent material and arranged with graduations to indicate predetermined quantities of food to be ejected from the body.

Other objects and advantages of the invention will hereinafter appear.

In the drawing accompanying and forming a part of this application Figure 1 is a side elevation of my improved feeding device and showing means connected to the body of the device for entering and building up and ejecting through fluid pressure or air in the body.

Figure 2 is a longitudinal sectional view, partly broken away, taken on the line 2—2 of Figure 1 looking in the direction of the arrows showing the closure released from the body.

Figure 3 is a sectional detail view, on an enlarged scale, taken on the line 3—3 of Figure 1 looking in the direction of the arrows to show the valve control means connected to the body for connecting means to the body for entering fluid pressure or air into the body; and Figure 4 is a sectional view, on an enlarged scale, of the lower portion of the body and the valve means for controlling the connection of the spout with the body to show the arrangement of the valve means and connection thereof to the valve actuating rod.

In carrying out the invention there is provided a tubular food containing body 5 constructed of transparent material, such as a suitable plastic or glass, the body having a spout 6 at one end and the opposite end adapted to be closed by a removable closure 7 having a suitable connection, such as a screw threaded connection 8, with the body, with a packing ring 9 interposed between the closure and the end of the body to provide an air tight connection between the closure and body. The body is provided with graduations for indicating predetermined quantities of food to constitute successive feedings to be discharged from the body.

The food or material is discharged from the body by means of fluid or air pressure. For this purpose a tubular member 11 is mounted and sealed in a flange 12 disposed about and extending outwardly from an opening in the wall of the body, said opening being disposed intermediate the ends and preferably nearer the spout end of the body. This member 11 is in the nature of a coupling for connection of means for entering and building up air pressure in the body, or for connection to a source of air under pressure. For this purpose the member is provided with annular laterally extending projections 13, which may be a screw thread for connection of a coupling of a flexible conduit leading from a source of air pressure. As shown it is adapted for connection of a reduced portion 14 of a hand operated bulb 15 of flexible material, the bulb having an air inlet 16 controlled by a valve shown, as a flat valve 17, opening inwardly to and closing outwardly from the bulb and normally assuming inlet closing position. The member 11 is provided with valve means for controlling the connection of the body with the means for entering air therein. For this purpose the bore in the member 11 has the inner end portion arranged of increased diameter and forming at the juncture thereof with the portion of less diameter a seat for a ball valve 18 opening into and closing outwardly of the body 5 and normally urged to closed position by a helical spiral spring 19 seated at one end against the ball and at the opposite end against a sleeve 20 having a drive fit in the opposite end of the bore.

To control the discharge of the food from the body 5 a manually operative valve is provided, consisting of a rod 21 and a valve head 22 carried by the rod adapted to be seated and unseated from a bevelled portion at the connection of the body to the spout. The valve head includes one or more disks of flexible material abutting a disk 23 of rigid material engaging a shoulder formed by reducing the end of the rod, and the valve disk is retained on the rod in abutting relation to the disk 23 by the conical end of a nut 24 threaded on to the end of the rod at the opposite side of the flexible disks of the valve head, the nut having an elongated tapered and re-reduced portion adapted to engage in the spout and clear any material that may be lodged in the juncture of the spout with the body. The valve rod 21 is extended through and slidable in a stuffing box 25 mounted on the closure 7 with a portion of the rod extending from the closure to permit removing the closure for filling the food into the body without unseating the valve 22. The rod is bent reversely upon itself to extend relative to the body, as at 26, and the end provided with a thumb or finger engaging loop 27. When the device is to be used the valve 22 is in closed position to shut off the spout from the body and the ejecting air pressure is entered into the body. In this condition the spout is engaged into the beak of the squab, the squab being held in one hand and the device being grasped by the other hand with the thumb or finger engaging in the rod loop 27. After the spout has been engaged in the beak and the air pressure built up in the body the valve rod 26 is actuated to unseat the valve 22 to open communication between the spout and body and discharge the food from the body through the spout. After the desired quantity of food has been fed, as indicated by the level of the food in the body relative to a graduation 10 on the body, the valve 22 is actuated to closed position to shut off communication between the spout and the body of the device. To prevent injuring the birds, particularly young squabs, during the feeding of the same by the spout a needle 28 of flexible material, such as rubber, is applied to the spout.

It will be obvious that various modifications may be made in the construction and arrangement of parts without departing from the scope of the invention.

Having described my invention, I claim:

1. In a feeding device including a tubular squab feed containing body having a spout at one end and a removable closure at the opposite end, valve controlled means mounted in the wall of the body intermediate the ends thereof opening into and closing outwardly from the body and urged to the outlet closing position, and said valve controlled means adapted for the connection of means for entering fluid pressure into the body for ejecting the feed from the body through the spout thereof, a valve adapted to be seated at the juncture of the spout with the body to shut off communication between the body and spout, and a rod connected to and carrying said valve extended through and slidable in the closure at the end of the body, said valve rod being of greater length than the body and a portion exterior of the body bent reversely to extend adjacent the valve controlled means and arranged with a thumb engaging portion to actuate the valve simultaneously with the manipulating of the body in the feeding operation.

2. In a feeding device including a tubular feed containing body having a spout at one end and a removable closure at the opposite end, a rod carrying a valve adapted to be seated at the juncture of the spout with the body to control the connection of the spout with the body, and said rod extended through and slidable in the closure for the one end of the body and adapted for actuation exterior of the body to seat and unseat the valve, and a tubular member connected to the body intermediate the ends thereof having a spring influenced valve controlling the opening in said tubular member opening into and closing outwardly from the body, and said member adapted for the connection of means for unseating said valve and entering fluid pressure in the body for ejecting the feed from the body through the spout thereof.

3. In a feeding device including a tubular feed containing body having a spout at one end and a removable closure at the opposite end, a valve adapted to be seated and unseated from the juncture of the body with the spout to control the connection of the spout with the body and ejection of the feed from the body, a rod carrying said valve extended through and slidable in a stuffing box mounted in the closure for the one end of the body, and said rod bent reversely upon itself exterior of and to extend relative to the body and the end of the rod arranged with a finger engaging portion, and a bulb of resilient material having an opening arranged with a valve opening into and closing outwardly from the bulb and having connection with the body intermediate the ends thereof controlled by a spring influenced valve opening into and closing outwardly from the body, said bulb adapted to be collapsed and thereby unseat the valve in its connection with the body and enter air into the body for ejecting the feed from the body through the spout thereof.

4. In a feeding device including a tubular feed containing body having a spout at one end and a removable closure at the opposite end, a stuffing box mounted in said closure, a valve adapted to be seated and unseated from the juncture of the body with the spout and thereby control connection of the spout with the body, said valve having a portion projecting therefrom adapted to be engaged in the spout when the valve is seated at the juncture of the spout with the body to clear material from the spout, a rod fixed to and carrying said valve extended through and slidable in the stuffing box in the closure at one end of the body, said rod having a portion bent reversely and disposed adjacent the exterior of the body adapted to be engaged by a finger of the hand grasping and manipulating the body in the feeding operation to seat and unseat the valve carried thereby, a tubular member mounted in the wall of the body intermediate the ends thereof with the opening therein in communication with the body and arranged for the connection of means for entering air into the body for ejecting the feed from the body, and a spring influenced valve for controlling the opening in said member opening into and closing outwardly from the body and normally urged to closing position.

PHILIP MORREALE.